(12) United States Patent
Lombaert et al.

(10) Patent No.: US 10,837,182 B2
(45) Date of Patent: *Nov. 17, 2020

(54) PANEL AND METHOD FOR MANUFACTURING PANELS

(71) Applicant: BerryAlloc NV, Menen (BE)

(72) Inventors: Pol Lombaert, Menen (BE); Matthias Wyseur, Menen (BE); Tim Vanderhaegen, Menen (BE)

(73) Assignee: BerryAlloc NV, Menen (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,704

(22) Filed: Aug. 22, 2019

(65) Prior Publication Data

US 2019/0383030 A1    Dec. 19, 2019

Related U.S. Application Data

(63) Continuation of application No. 15/309,251, filed on Nov. 7, 2016, now Pat. No. 10,392,813.

(51) Int. Cl.
| | | |
|---|---|---|
| *E04F 15/10* | (2006.01) | |
| *B32B 3/30* | (2006.01) | |
| *B32B 5/24* | (2006.01) | |
| *B32B 27/12* | (2006.01) | |
| *B32B 27/30* | (2006.01) | |

(Continued)

(52) U.S. Cl.
CPC .............. *E04F 15/102* (2013.01); *B32B 3/30* (2013.01); *B32B 5/24* (2013.01); *B32B 5/245* (2013.01); *B32B 27/12* (2013.01); *B32B 27/304* (2013.01); *B32B 33/00* (2013.01); *E04F 13/077* (2013.01); *E04F 15/02033* (2013.01); *E04F 15/105* (2013.01); *E04F 15/107* (2013.01); *B32B 37/153* (2013.01); *B32B 38/06* (2013.01); *B32B 38/145* (2013.01); *B32B 2038/0084* (2013.01); *B32B 2250/05* (2013.01); *B32B 2262/101* (2013.01); *B32B 2307/412* (2013.01); *B32B 2307/554* (2013.01); *B32B 2315/085* (2013.01);

(Continued)

(58) Field of Classification Search
CPC ..... E04F 15/102; E04F 15/105; E04F 15/107; E04F 13/077; B32B 5/24; B32B 5/245; B32B 3/30; B32B 27/12; B32B 27/304
See application file for complete search history.

(56) References Cited

U.S. PATENT DOCUMENTS

| | | |
|---|---|---|
| 4,409,280 A | 10/1983 | Wiley |
| 7,186,453 B2 | 3/2007 | Mauk |

(Continued)

FOREIGN PATENT DOCUMENTS

| | | |
|---|---|---|
| EP | 1938963 A1 | 7/2008 |
| EP | 2339092 A1 | 6/2011 |

(Continued)

*Primary Examiner* — Catherine A. Simone
(74) *Attorney, Agent, or Firm* — James Creighton Wray

(57) ABSTRACT

The present invention relates to a panel and method for manufacturing panels for wall or floor coverings, comprising two or more thermoplastic layers including at least one thermoplastic substrate layer and at least one top layer comprising at least a decor layer, a print layer and a transparent wear layer, and wherein both said thermoplastic substrate layer and said top layer are provided with a reinforcement layer, wherein said transparent wear layer is provided with a relief.

13 Claims, 2 Drawing Sheets

(51) Int. Cl.
  *E04F 15/02*   (2006.01)
  *E04F 13/077*  (2006.01)
  *B32B 33/00*   (2006.01)
  *B32B 37/15*       (2006.01)
  *B32B 38/00*       (2006.01)
  *B32B 38/06*       (2006.01)

(52) U.S. Cl.
  CPC ....... *B32B 2451/00* (2013.01); *B32B 2471/00* (2013.01); *B32B 2607/00* (2013.01)

(56) References Cited

U.S. PATENT DOCUMENTS

| | | | |
|---|---|---|---|
| 10,392,813 B2* | 8/2019 | Lombaert | ................. B32B 3/30 |
| 2002/0100231 A1 | 8/2002 | Miller | |
| 2004/0086678 A1 | 5/2004 | Chen | |
| 2005/0025934 A1* | 2/2005 | Thiers | ....................... B44C 1/24 |
| | | | 428/151 |
| 2009/0061168 A1* | 3/2009 | Kim | ....................... E04F 15/10 |
| | | | 428/195.1 |
| 2012/0196098 A1 | 8/2012 | Duyck | |
| 2013/0330513 A1 | 12/2013 | Ketzer | |
| 2014/0329062 A1 | 11/2014 | Song | |
| 2015/0375471 A1* | 12/2015 | Song | .................... B32B 37/182 |
| | | | 428/159 |

FOREIGN PATENT DOCUMENTS

| | | | |
|---|---|---|---|
| EP | 2481848 A1 | 8/2012 |
| WO | 2010023042 A2 | 3/2010 |
| WO | 2011141849 A2 | 11/2011 |

* cited by examiner

PANEL AND METHOD FOR MANUFACTURING PANELS

This application is a continuation of Application Ser. No. 15/309,251 filed Nov. 7, 2016, which is hereby incorporated by reference in its entirety as if fully set forth herein.

TECHNICAL FIELD

The present invention relates to floor and wall panels, and methods for manufacturing floor and wall panels. In particular, the invention relates to floor and wall panels comprising a thermoplastic substrate layer, and a top layer comprising a wear layer.

BACKGROUND

Panels for floor or wall coverings are generally designed as a double structure comprising at least a substrate layer and a top layer, wherein the top layer is provided with a print layer or printing in the form of a motif, such as, for example, wood fibres or a concrete structure. Such panels are optionally provided with connection means or connection parts for easily connecting or fixing two or more panels, so that a floor or wall covering is obtained.

Such panels are known from the prior art. In this way, EP 1 938 963 discloses, for example, a panel with a decor layer or film on an upper side of a core of plastic and a transparent finishing layer on top of said decor film. A transparent lacquer layer is applied on the finishing layer, and a back-pull layer is provided on the back of the core. A lockable tongue-and-groove connection is provided at two mutually opposite edges of the panel. The decor layer includes a PVC film that is printed with a decor, and the lacquer layer is cured by means of UV. The panel has a thickness of 4 to 8 millimeters, and the weight per unit of surface area ranges from 1.5 to 2.0 kilograms per square meter per mm thickness.

Alternatively, EP 2 339 092 discloses a panel for forming a covering, in particular a floor panel for forming a floor covering, which comprises coupling parts at least at two mutually opposite edges to couple two of such panels to one another by means of a downward movement of a panel relative to the other wherein these coupling parts comprise a first locking system which effects a locking in the plane of the panels and perpendicularly to said edges, and comprise a second locking system which effects a locking in the plane perpendicular to the plane of the panels wherein at least one of the coupling parts is at least partly realized from soft PVC (polyvinyl chloride), as well as at least partly in the form of a profiled part of soft PVC.

In yet a different embodiment, the prior art provides a floor panel according to WO 2010/023042, comprising a carrier layer comprising a plastic material that is flexible and elastic at an operating temperature of the floor, a decorative layer which is applied above the carrier layer, additional mechanical locking means arranged on at least two plate edges, wherein said locking means correspond to the locked condition of two floor panels.

Such panels offer an attractive visual and acoustic aspect on the one hand, while properties such as ease of implementation, stiffness and durability are also emphasized. However, to obtain optimal properties of said panels for floor or wall covering remains a challenge. For instance, panels according to the prior art appear to be strongly subject to contraction and expansion under the influence of temperature. Contraction and expansion will lead to the deformation of the wall or floor covering, as a result of which the individual panels are pushed out of the plane and moreover, a mutual release of the connection means, or the phenomenon that the individual plate-shaped elements are driven apart from one another, as a result of which gaps occur.

The prior art does not or does not adequately provide a solution to one or more of the afore-mentioned problems.

SUMMARY

To this aim, the invention provides in a first aspect a panel for wall or floor covering comprising two or more thermoplastic layers including at least one thermoplastic substrate layer and at least one top layer comprising at least a decor layer, a print layer and a transparent wear layer, and wherein both said thermoplastic substrate layer and said top layer are provided with a reinforcement layer, wherein said transparent wear layer is provided with a relief. Preferably, said relief is at least partially in register with said underlying print layer.

This has the advantage that a better dimensional stability is obtained from said panel.

Moreover, a panel is provided by the invention wherein an improved overlap is realized between on the one hand said relief and on the other hand a printing or decor on said underlying print layer.

In a second aspect, the present invention provides a method for manufacturing panels for wall or floor covering, wherein a plurality of thermoplastic layers, at least one decor layer with printing, and at least a transparent wear layer are laminated, and wherein at least two of said thermoplastic layers comprise glass fibres, thereby obtaining a panel, wherein said wear layer in a subsequent step is heated and is printed by means of a mechanical press in register with said printing.

DETAILED DESCRIPTION OF THE FIGURES

The explicit characteristics, advantages and objectives of the present invention will further become clear to the skilled person in the technical field of the invention after reading the following detailed description of the embodiment of the invention and of the figures enclosed herein. The figures serve the purpose to further illustrate the invention, without thereby limiting the scope of the invention.

FIG. 1 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

FIG. 2 is a schematic representation of the cross-section of a panel according to the invention with indication of connection means which are provided along the edges of said panel.

FIG. 3 is a schematic detail representation of connection means of panels connected laterally in connected state.

FIG. 4 is a perspective representation of a panel according to the invention with indication of a relief (7) on the upper surface of said panel.

DETAILED DESCRIPTION OF THE INVENTION

Unless defined otherwise, all terms used in the description of the invention, including technical and scientific terms, have the meaning as is commonly understood by the skilled person in the technical field of the invention. For a better assessment of the description of the invention, the following terms are explained explicitly.

"A", "an" and "the" refer in this document to both the singular and the plural, unless the context clearly implies otherwise. For example, "a segment" means one or more than one segment.

When "around" or "about" is used in this document with a measurable quantity, a parameter, a time period or moment in time, and the like, then variations are meant of +/−20% or less, preferably +/−10% or less, more preferably +/−5% or less, even more preferably +/−1% or less, and even more preferably +/−0.1% or less than and of the cited value, to the extent that such variations apply in the described invention. It should, however, be understood that the value of the quantity in which the term "around" or "about" is used, is itself specifically disclosed.

The terms "comprise", "comprising", "consist of", "consisting of", "provided with", "include" "including", "contain", "containing", "encompass", "encompassing" are synonyms and are inclusive or open terms that indicate the presence of what follows, and which do not exclude or prevent the presence of other components, features, elements, members, steps, known from or described in the prior art.

Quoting numerical intervals by endpoints includes all integers, fractions and/or real numbers between the endpoints, these endpoints included.

Figure 1:
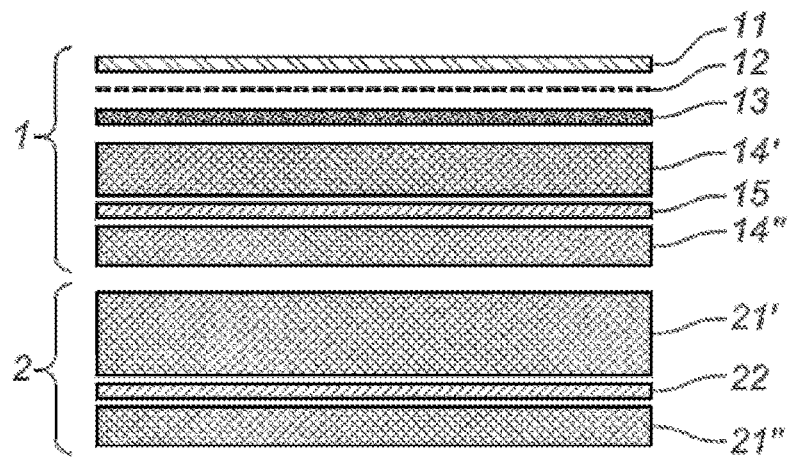
FIGS. 1 to 4 represent a simplified representation of a panel according to the first aspect of the invention.

In a first aspect, the invention provides a panel for wall or floor covering comprising two or more thermoplastic layers including at least one thermoplastic substrate layer and at least one top layer comprising at least a decor layer, a print layer and a transparent wear layer, and wherein both said thermoplastic substrate layer and said top layer are provided with a reinforcement layer, wherein said transparent wear layer is provided with a relief. Preferably, said relief is at least partially in register with said underlying print layer. Such composition of a panel according to the invention is shown in FIG. 1. FIG. 1 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

In a preferred embodiment, said panel according to the first aspect of the invention comprises a top layer with a printed decor, and a protective layer or wear layer provided above that. Said printed decor or decor layer with print layer may consist of a printed plastic film with a thickness ranging between 0.1 mm and 1.0 mm and may be made of PVC film, PU film, PP film, or PET film, but is preferably made of PVC film. Preferably, said PVC film is a hard PVC film with a low content of plasticizers, by this, it is meant that the plasticizer content in said PVC is lower than 15% by weight, and preferably lower than 5% by weight. Most preferably, said PVC film does not comprise plasticizers. Even more preferably, a PVC film is used with a K-value comprised between 50 and 80, measured according to EN ISO 1628-2, and more preferably, a K-value between 60 and 75. This offers the advantage of a hard PVC layer which can be printed very accurately. In addition, the drying process after the printing with water-based inks is very simply by means of the necessary heat supply to the said decor layer. In an optional embodiment, said top layer may additionally comprise a UV surface coating, for example, to improve the gloss, but also the resistance to staining.

In a preferred embodiment, the present invention provides a panel according to the first aspect of the invention, wherein the protective layer and/or, if applied, the substrate layer are provided with a relief or surface structure which is obtained by the chemical and/or mechanical structuring, preferably the chemical and mechanical structuring. Such mechanical printing is an alternative to chemical printing (such as, for example, a standard foaming process for the print layer) and is often used for structures which are not in register with the printing. Chemical printing is applied in register with the printing, yet will generally result in a shallower and less accurate structure. In most cases, only the protective layer will be subject to mechanical printing.

In a preferred embodiment, the present invention provides a panel according to the first aspect of the invention, wherein at least one of the said thermoplastic layers comprise polyvinyl chloride (PVC).

Preferably, said wear layer is a translucent or transparent layer through which the aspect of the underlying decor is visible. Such transparent layer can be easily obtained by means of extrusion, coating and/or calendering of a thermoplastic material. A suitable material choice can be made by selection from a group comprising PVC, PU, PP or PET, but preferably PVC. Even more preferably, a PVC is used for said wear layer with a K-value comprised between 60 and 95, measured according to EN ISO 1628-2, and more preferably a K-value between 70 and 85. Optionally, additives can be added for enhancing the wear resistance, yet this does not appear to be necessary for a proper execution in order to maintain a sufficient wear resistance. A sufficient wear resistance can be understood as a panel from class AC2 or AC3, measured according to EN 660 and/or EN 13329, and references cited therein. Preferably, said wear layer has a thickness of at least 0.10 mm and more preferably at least 0.12 mm. Preferably, said thickness is less than 1.0 mm and more preferably less than 0.75 mm. Most preferably, said wear layer has a thickness comprised between 0.15 mm and 0.70 mm. Such wear layers are found to have a sufficient wear resistance, and succeed in Taber tests with an IP value of 2000 or more, measured according to EN 13329. In a most preferred embodiment, the present invention provides a panel according to the first aspect of the invention, wherein said transparent wear layer comprises PVC.

In a more preferred embodiment, said thermoplastic layers comprise one or more reinforcement layers. Said reinforcement layers are intended to improve the stiffness and the dimensional stability of said panels. Said reinforcement layer is preferably disposed in both said substrate layer and in said top layer. Preferably, at least one reinforcement layer is situated predominantly in the lower half of said panel and at least one reinforcement layer is situated predominantly in the upper half of said panel. This offers the advantage that the tendency to bend or curve is suppressed as much as possible. Such a tendency can especially arise or occur in temperature fluctuations and especially at elevated temperatures.

In a more preferred embodiment, said panel according to the invention comprises essentially a top layer and a substrate layer, wherein said layers enclose a reinforcement layer. Preferably, said panel is comprised out of the above-mentioned layers for more than 75% by weight, and more preferably for more than 90% by weight.

In a preferred embodiment, said substrate layer has a thickness comprised between 0.5 mm and 8.0 mm, and more preferably between 1.0 mm and 4.5 mm. Even more preferably, said panel is comprised out of said substrate layer for at least 50% by weight, and more preferably for at least 60% by weight.

In a preferred embodiment, the present invention provides a panel according to the first aspect of the invention, wherein said substrate layer comprises a PVC foam. In a more preferred embodiment, said substrate layer comprises a closed cell and/or partly open cell PVC foam having a density of between 200 kg/m$^3$ and 2500 kg/m$^3$, and more preferably between 600 kg/m$^3$ and 2000 kg/m$^3$. Most preferably, said density is comprised between 800 kg/m$^3$ and 1600 kg/m$^3$. Such panels provide a good rigidity, stiffness and dimensional stability, as well as a good water-resistance, and improved acoustic and/or thermal insulating properties. Preferably, the afore-mentioned substrate layer comprises a foamed PVC sheet, or a foamed plastic sheet which consists essentially of another vinyl compound, such as polyvinyl dichloride, polyvinyl butyrate, polyvinyl acetate and the like. As an alternative, melamine foam, polyurethane or polyisocyanurate can also be used as the basic material for the substrate. As mentioned above as well, an average density of the plastic sheet of about 1200 kilograms per cubic meter leads to an optimal result of all the beneficial and adverse effects. For example, a lower density provides a lower material consumption and a lower weight, which is advantageous during transport and installation; however, exhibiting a lower stiffness, a less desirable acoustic, insulating properties and a high residual indentation. Preferably, said residual indentation is less than 0.5 mm, measured according to EN ISO 24343 or ASTM F 1914. More preferably, said residual indentation is less than 0.2 mm and even more preferably less than 0.1 mm. This can be obtained by providing a sufficiently low density and a lower content of plasticizer. Such density can be achieved by means of plastic materials of the closed cell type, this in contrast to the common hard foams of the open-cell type, for example, polyester hard foams.

In an optional embodiment, said panel according to the invention is further provided with a balance layer, which is intended as a counter weight or balance for said top layer. Such balance layer typically comprises a thermoplastic plastic layer, and typically has a thickness and weight of approximately equal to said top layer, yet preferably slightly thinner and lighter. However, preferably such balance layer is not present in the preferred embodiment of the panel according to the invention. Thus, said substrate layer in such an embodiment also forms the bottom layer of said panel without further protective layer.

In a preferred embodiment of a panel according to the first aspect of the invention, said thermoplastic layers comprise, in addition to said reinforcement layer, also fillers such as, for example, but not limited to, limestone and/or chalk.

In an optional embodiment, said panel according to the invention is further provided with a protective lacquer layer. Such lacquer layer may for instance be implemented as a PU layer and/or a curing lacquer layer, such as, for example, but not limited to a UV or electron beam curing lacquer layer.

In a preferred embodiment of a panel according to the first aspect of the invention, said panel provides at least at two mutually opposite edges, and preferably at four mutually opposite edges, connection means or attachment means for laterally connecting two panels next to one another and substantially in the same plane. Preferably, said connection means relate to mechanical connection means for a locking or fixation of both constituting panels, both in the vertical direction, this is the direction perpendicular to the plane of said constituting panels, and in the horizontal direction, this is the direction in the plane of said constituting panels.

In a more preferred embodiment, the invention provides a panel according to the first aspect of the invention, wherein said panel provides said mechanical connection means in an embodiment comprising a lateral protrusion and recess, respectively, wherein said protrusion and recess essentially correspond with one another with regard to form, yet in the connected state, is provided with possible open spaces in the longitudinal direction of said edges, wherein said open spaces are intended to build up a well-defined flexural tension in said lateral protrusion during the connecting of panels in order to thus secondarily fix said constituting panels with respect to one another.

In an even more preferred embodiment, the invention provides a panel according to the first aspect of the invention, wherein said panel provides said mechanical connection means, as described in the preceding paragraph, wherein said lateral protrusion is further equipped with a secondary, transverse protrusion and wherein said lateral recess is further equipped with a secondary, transverse recess, in a way that both constituting panels, when positioned in the connected state relative to one another, aforementioned secondary, transverse protrusion and said secondary, transverse recess overlap and thus ensure a mechanical anchoring of both afore-mentioned constituting panels in the secondary direction, this is the direction in the plane of said panels, yet perpendicular to the longitudinal direction of said edges.

In a preferred embodiment, the invention provides a panel according to the first aspect of the invention, wherein said mechanical connection means are further provided in an embodiment suitable for the corresponding connection of the constituting connection parts, as is known for example from, but not limited to, WO 94/26999 or EP 1 026 341. Such corresponding connection can, for example, be built up by the application of a curvature in said lateral protrusion. Preferably, said lateral protrusion is implemented in such way that both constituting connection parts are composed by sliding said constituting panels towards one another in the horizontal direction, this is the direction in the plane of said constituting panels.

In a preferred embodiment, the invention provides a panel according to the first aspect of the invention, wherein said connection means were obtained by means of a milling operation on the edges of said constituting panels.

Figure 2:
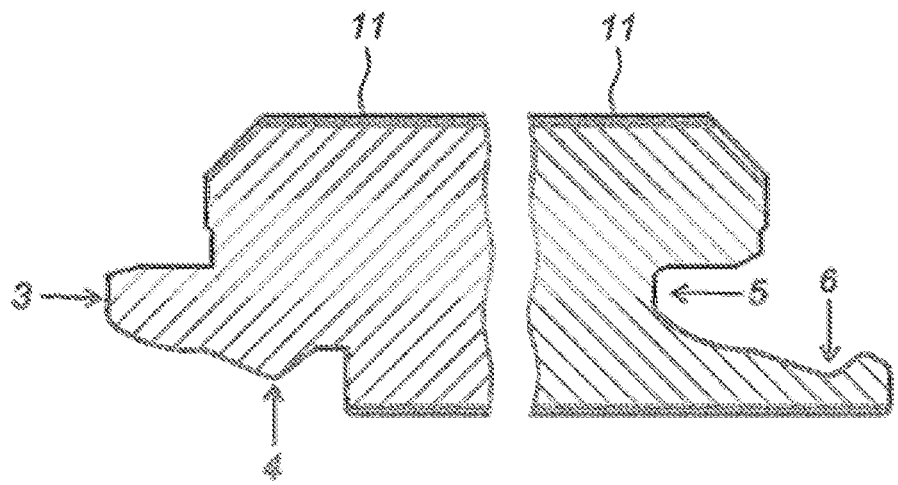
Figure 3:
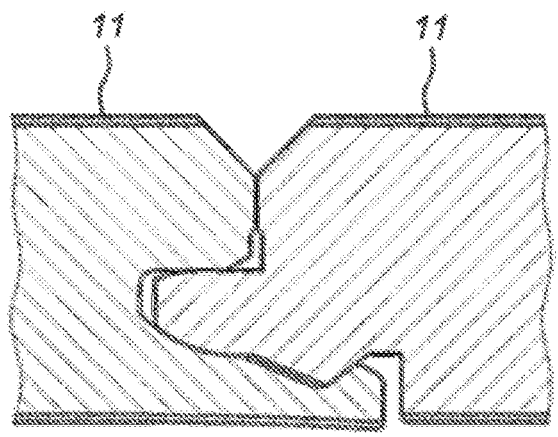

FIG. 2 is a schematic representation of the cross-section of a panel according to the invention with indication of connection means which are provided along the edges of said panel. In FIG. 2, the lateral protrusion (3) was also equipped with a secondary, transverse protrusion (4). In an analogous manner, the lateral recess (5) is further equipped with a secondary, transverse recess (6). FIG. 3 is a schematic detail representation of connection means of panels connected laterally in the connected state.

In a preferred embodiment, the invention provides a panel according to the first aspect of the invention, wherein said connection means are substantially comprised in the above-mentioned substrate layer, wherein said substrate layer preferably comprises said at least one reinforcement layer. More preferably, the afore-mentioned connection means re provided in said panel in such way, so that said at least one reinforcement layer is comprised in afore-mentioned lateral protrusion, to thus provide sufficient strength to said connection means. Even more preferably, the afore-mentioned panel according to the invention is provided in a form wherein at least two pairs of corresponding opposite edges are provided, wherein said edges are provided with the afore-mentioned connection means.

In a preferred embodiment, the invention provides a panel according to the first aspect of the invention, wherein said connection means have a thickness of at least 2.0 mm, and preferably at least 2.5 mm. More preferably, said connection means have a thickness of at least 3.0 mm, and still more preferably, said connection means have a maximum thickness of 6.0 mm and most preferably maximally 5.0 mm. Such thickness of the afore-mentioned connection means, optionally and preferably designed additionally with the afore-mentioned reinforcement layer, usually provides a sufficiently qualitative bond between the constituting parts and, moreover, is generally sufficiently strong to withstand possible damage during transportation or construction of the mentioned floor or wall coverings.

Although the invention according to a preferred embodiment provides connection means along the edges of afore-mentioned panels, the skilled person in the technical field of floor and/or wall coverings will appreciate the fact that said panels can be implemented in the absence of said connection means. In such an embodiment, said panels are intended to be fixed on a subsurface, for example by means of gluing. The binder or the bonding ensures a further stabilization of the dimensions of the panels. An alternative to the afore-mentioned bonding, a fixative can also be used. Such fixative or fixing agent signifies an adhesive which is suitable to bind panels to a subsurface, yet can be removed in a simple manner and without causing damage to the subsurface. By stabilization by one or more reinforcement layers, an effective gluing appears to be unnecessary. In such cases, said panels can be designed with a total thickness of afore-mentioned substrate layer and afore-mentioned top layer situated between 1.0 mm and 5.0 mm and preferably situated between 1.5 mm and 4.0 mm. Most preferably, the afore-mentioned thickness is situated between 2.0 mm and 3.0 mm. In an analogous, yet separate embodiment, a panel according to the first aspect of the invention is provided with a thickness comprised between 4.0 mm and 10.0 mm, and more preferably between 6.0 mm and 8.0 mm. Such panels are usually used as so-called loose panels, or referred to by the English term as "loose-lays", by which is meant that no additional adhesive or fixative is used to fix the panels onto a subsurface. Nevertheless, one can opt to still apply such an adhesive.

In a preferred embodiment, the present invention provides a panel according to the first aspect of the invention, wherein said reinforcement layers comprise glass fibres.

In a preferred embodiment, the invention provides a panel according to the first aspect of the invention, wherein said glass fibres are comprised in a glass fibre fleece and/or in a glass fibre cloth. Preferably, said glass fibres are comprised in a glass fibre fleece, for example a nonwoven. Such nonwoven glass fibres appear to have a better embedding in the thermoplastic matrix, thereby obtaining a stronger and more rigid layer.

In a more preferred embodiment, the invention provides a panel according to the first aspect of the invention, wherein said glass fibre is pre-treated with an adhesion additive which is intended to improve the adhesion between said glass fibres and said thermoplastic matrix. For example, said glass fibres are impregnated beforehand with the aid of a thermoplastic material, such as, for example, extruded granulate.

In a preferred embodiment, the invention provides a panel according to the first aspect of the invention, wherein at least said substrate layer and/or at least said top layer comprise additionally individual reinforcing fibres, wherein said individual reinforcing fibres are not laterally interconnected in a network, but are dispersed loosely in a plastic matrix. Preferably, said reinforcing fibres have a length of at least 0.8 mm, and more preferably at least 1.0 mm. Such reinforcing fibres and/or reinforcement layers are intended to contribute to the dimensional stability of said panels according to the invention, which stability is especially desirable against expansion and contraction.

Preferably, said reinforcing fibres are spread out in said one or more thermoplastic layers, whether or not in the form of a glass fibre cloth and/or a glass fibre fleece.

In a more preferred embodiment, the invention provides a panel according to the first aspect of the invention, wherein said individual reinforcing fibres have an average length of at least 3.0 mm, and preferably an average length of at least 4.5 mm. Preferably, said length is at most 20.0 mm, more preferably at most 12.0 mm, and still more preferably at most 9.0 mm. Preferably, said reinforcing fibres are comprised in said thermoplastic layers in a quantity of between 1 and 25% by weight, and more preferably between 5 and 15% by weight, relative with respect to the total weight of said reinforcing fibres and thermoplastic layers. Still preferably, said fibres correspond to the description according to the DIN 1259 standard. In a first embodiment, said reinforcing fibres comprise glass fibres, however, in an alternative embodiment, steel fibres, carbon fibres, aramid fibres, polyethylene fibres and/or polypropylene fibres may also be used. In yet an alternative embodiment, fibres from biological origin are used, such as for example, but not limited to, flax fibre, bamboo fibre, wood fibre, rice fibre. Said reinforcing fibres preferably have an average diameter ranging between 1 μm and 100 μm, yet more preferably ranging between 3 μm and 30 μm. Most preferably, said average diameter ranges between 5 μm and 25 μm. In a further preferred embodiment, said reinforcing fibres are pre-treated with an additive or coating for improving the adhesion between said reinforcing fibres and said thermoplastic layers, for example, but not limited to, silane. In a further preferred embodiment, reinforcing fibres are selected having a thermal expansion coefficient smaller than the thermal expansion coefficient of said thermoplastic layers in which said fibres are incorporated and/or with a Young's modulus which is preferably greater than the modulus of said thermoplastic layers, and preferably greater than 40 GPa, and more preferably greater than 60 GPa. In an additional preferred embodiment, said invention provides a panel with reinforcing fibres having a thermal expansion coefficient of less than 30 μm/m.K, and more preferably less than 5 μm/m.K.

In a preferred embodiment, the present invention provides a panel according to the first aspect of the invention, wherein said glass fibres have a length of 1 mm or more, and preferably a length of 3 mm or more. In a preferred embodiment, the present invention provides a panel according to the first aspect of the invention, wherein said glass fibres have a diameter situated between 5 and 25 μm.

In a preferred embodiment, the invention provides a panel according to the first aspect of the invention, wherein preferably said thermoplastics comprise polyvinyl chloride, preferably semi-rigid or possibly soft polyvinyl chloride, that is PVC with plasticizers, for example, with a proportion of plasticizers in the PVC of less than 15% by weight relative to the total weight of said thermoplastic layer, and more preferably less than 10% by weight. In a first embodiment, said PVC layer is intended in a panel with high rigidity and said plasticizers are comprised between 0 and 5% by weight and preferably between 0 and 3% by weight. In a second embodiment, said PVC is intended in a panel with high flexibility and said plasticizers are comprised between 5 and 12% by weight, and preferably between 8 and 10% by weight. It is clear that instead of PVC, polypropylene (PP), polyethylene (PE), polyester (PET), polyurethane (PUR) and/or polyamide (PA) can also be used.

In a preferred embodiment, the present invention provides a panel according to the first aspect of the invention, wherein the overlap of said relief with a pattern on said underlying print layer is at least 90%. Preferably, said print layer may then either be applied via a separate printed film or printed on the underside of the wear layer, for example by means of rotogravure printing, offset printing or inkjet printing, preferably by means of UV-based inks or solvent inks.

Figure 4:
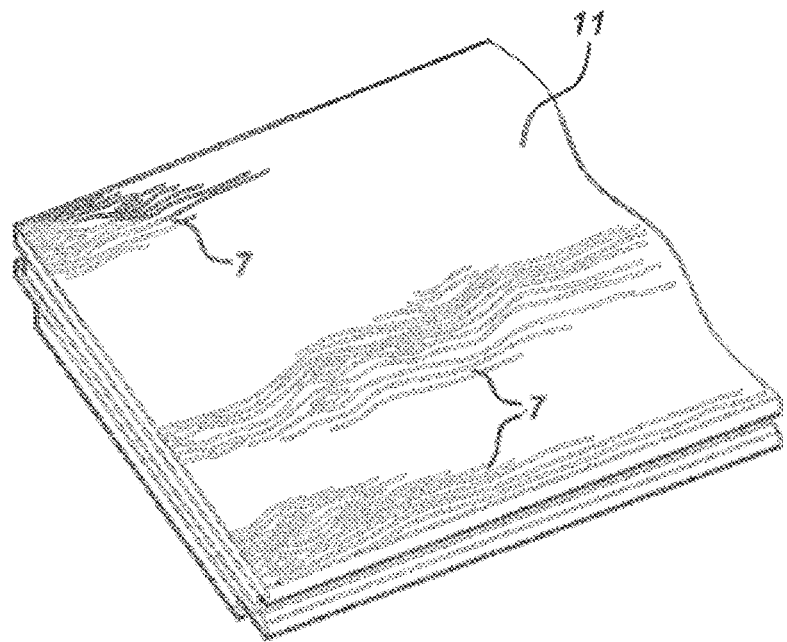

In a preferred embodiment, the present invention provides a panel according to the first aspect of the invention, wherein the overlap of said relief with a pattern on said underlying print layer ranges between 95% and 100%. In a more preferred embodiment, said overlap is more than 96%, more than 97% and even more than 98% accurate, and most preferably more than 99%. FIG. 4 is a perspective representation of a panel according to the invention with indication of a relief (7) on the upper surface of said panel.

In a preferred embodiment, the present invention provides a panel according to the first aspect of the invention, wherein said relief has a depth of at least 0.05 mm and preferably at least 0.1 mm. In an even more preferred embodiment, the present invention provides a panel, wherein said relief has a depth of at most 0.4 mm and preferably ranging between 0.1 mm and 0.3 mm. Most preferably, said relief has a depth of approximately 0.2 mm.

In a more preferred embodiment, the afore-mentioned panels according to the first aspect of the invention are designed in a rectangular shape for providing panels or in an approximately square shape for providing tiles. In a first embodiment, said panels are designed in a rectangular shape with a length ranging between 0.5 m and 3.0 m, preferably between 0.9 m and 2.5 m, and more preferably between 0.9 m and 1.8 m; and with a width ranging between 5 cm and 25 cm, preferably between 7 cm and 25 cm, and most preferably between 15 cm and 25 cm. In an alternative embodiment, said tiles are designed in rectangular to approximately square shape with a side ranging between 10 cm and 100 cm, preferably between 15 cm and 75 cm, and more preferably between 20 cm and 60 cm.

In a second aspect, the present invention provides a method for manufacturing panels for wall or floor covering, wherein multiple thermoplastic layers, at least one decor layer with printing and at least a transparent wear layer are laminated, and wherein at least two of said thermoplastic layers comprise glass fibres, thereby obtaining a panel, wherein said wear layer in a subsequent step is heated and by means of a mechanical press in register with said printing, is printed.

The afore-mentioned method is preferably suitable for manufacturing panels for wall or floor covering according to the first aspect of the invention. Such thermal lamination is preferably done with the aid of a heated pressing device. In this, such a heated press cycle is preferably followed by a cold press cycle, which may or may not be carried out in the same pressing device. If it is not carried out in the same pressing device, however, preferably at least the same structured press element is used. In this way, problems with registration between two press elements can be avoided. For example, the thermoplastic layer with the press element arranged thereon can be brought from the one to the other pressing device as one package, without the contact between the press element and the thermoplastic layer being broken. It is noted that, in a hot press cycle, preferably a temperature is reached of more than 100° C. at the surface of the thermoplastic layer, while in a cold press cycle, preferably a temperature of less than 60° C. is reached at the surface of the thermoplastic layer.

According to a variant, the press element on the thermoplastic layer may be applied before the whole of at least the press element and the thermoplastic layer is conducted in the pressing device. In such a method, the thermoplastic layer can at least in part be heated prior to the pressing operation, because the press element is heated. The heating or warming of the press element can be performed, for example, by the use of magnetic induction. In such a method, it is possible to eliminate a separate heating of the thermoplastic layer. Preferably, a pressure is applied between 20 and 65 bar, wherein a pressure of about 40 bar is a good value. Preferably, the pressing is done for 12 to 60 seconds, better yet for 15 to 30 seconds.

The structure which, according to the second aspect, is applied in the surface of the thermoplastic layer concerns a decorative relief, such as, for example, a relief that imitates wood. Such relief may, for example, consist of separate imprints which imitate wood pores and which together form a structure which resembles a wood grain. Preferably, several of such wood pores follow a wood grain depicted in the motif. Of course, other structures may also be realized, such as stone structures.

In a preferred embodiment, the invention provides a method according to the second aspect of the invention, comprising at least the step of forming a first and a second thermoplastic layer, wherein preferably said thermoplastic layers are extruded. Preferably, said one or more thermoplastic layers are extruded and then immediately, thus in the melt state, arranged on a fibre material, for example a glass fibre cloth or a glass fibre fleece. Even more preferably, said thermoplastic melt is at least partially pressed through said fibre material, thereby providing a coating of said thermoplastic material on both sides of said fibre material, and, more specifically, on both sides of the afore-mentioned glass fibre fleece. Thus, a reinforcement layer is realized in a thermoplastic layer. Preferably, said reinforcing fibres and said thermoplastic layers are mixed in such a way that a quantity ranging between 1 and 25% by weight of fibre material, and more preferably between 5 and 15% by weight, relative to the total weight of said reinforcing fibres and thermoplastic layers. In an alternative embodiment, steel fibres, carbon fibres, aramid fibres, polyethylene fibres and/or polypropylene fibres are used for providing reinforcing fibres. In yet an alternative embodiment, fibres are used from biological origin, such as for example, but not limited to, flax fibre, bamboo fibre, wood fibre, rice fibre.

In a preferred embodiment, the invention provides a method according to the second aspect of the invention, comprising at least the step of bonding said thermoplastic layers to one another by means of lamination. Such lamination can be done by means of wet lamination, wherein a liquid adhesive and/or a thermoplastic melt, also known as hotmelt, is applied between said thermoplastic layers and then is dried and/or bound for connecting the respective layers; by means of dry lamination, wherein a self-adhesive layer is applied between the respective layers for thus establishing the connection; or by thermal lamination, wherein one or both contact surfaces of the afore-mentioned thermoplastic layers are heated and then the pressing to one another, to thus achieve a partial merging of both layers at the interphase surface with the formation of a bond as a result. In a preferred embodiment, said thermoplastic layers are thermally laminated. Preferably, the afore-mentioned thermal lamination process is carried out in a heated pressing device, such as for example, but not limited to a continuous pressing device.

In a preferred embodiment, the invention provides a method according to the second aspect of the invention, wherein the afore-mentioned extruded thermoplastic layers, after extrusion, are guided further under tension over rollers for the thermal treatment of said extruded layers and/or for reducing the thickness of said thermoplastic layers.

In an alternative embodiment, granulate of a thermoplastic material is arranged on a subsurface to then be consolidated into a thermoplastic layer by means of a preferably heated pressing operation. Preferably, a fibre material together with said thermoplastic granulate is arranged on a subsurface, wherein the dispersion of said fibres and said granulate is provided homogeneously interchangeably and/or concentrated at well-defined depths. Preferably, said subsurface comprises a conveyor belt to thus transport said layers to a, preferably continuous, pressing device for the consolidation of said layers.

In a preferred embodiment, the invention provides a method according to the second aspect of the invention, wherein at least one of afore-mentioned thermoplastic layers is obtained by extruding a thermoplastic material with plasticizers. Preferably, said thermoplastic granulate is mixed with said plasticizers in a ratio wherein the proportion of plasticizers in the PVC of less than 15% by weight relative to the total weight of said thermoplastic layer, and more preferably less than 10% by weight. In a first embodiment, said PVC layer is meant in a panel with high rigidity and said plasticizers are comprised between 0 and 5% by weight and preferably between 0 and 3% by weight. In a second embodiment, said PVC layer is meant in a panel with high flexibility and said plasticizers are comprised between 5 and 12% by weight, and preferably between 8 and 10% by weight. It is clear that instead of PVC, polypropylene (PP), polyethylene (PE), polyester (PET), polyurethane (PUR) and/or polyamide (PA) can also be used.

In a preferred embodiment, the invention provides a method according to the second aspect of the invention, wherein at least one of afore-mentioned thermoplastic layers is obtained by extruding a thermoplastic material with fillers. The afore-mentioned fillers may be pre-mixed into the thermoplastic material or may be extruded together with a thermoplastic material. Preferably, afore-mentioned granulates also comprise individual fibres, preferably glass fibres. Preferably, said fillers in said one or more thermoplastic layers are comprises in an amount of at least 40% by weight and preferably at least 50% by weight, and most preferably from 60 to 65% by weight, calculated relative to the total weight of said thermoplastic layer. Preferably, said fillers comprise chalk, and/or limestone.

Said reinforced thermoplastic layers are brought into a whole, and according to the embodiment according to the invention, are finished by means of a decor layer, a print layer and a wear layer. Such layers can be applied, respectively, by lamination, or as be printed, as in the case of said print layer, with preferably a water-soluble ink. Said layers to be laminated, such as, for example, decor layer and transparent wear layer, are preferably applied onto said thermoplastic layers wherein said one or more thermoplastic layers comprise preferably one or more reinforcement layers. Preferably, said layers are applied as a sheet which is consolidated on said thermoplastic layers by means of a thermal lamination process. Such thermal lamination step is preferably carried out with the aid of a continuous pressing device.

In a preferred embodiment of the method according to the second aspect of the invention, said wear layer is provided on said decor and print layer without the addition of one or more fibres to said wear layer. This offers the advantage that said wear layer can be provided in a translucent, transparent implementation, wherein said decor layer with printing is visible through said wear layer. This offers an important visual aspect to the obtained panel. Said decor layer is preferably provided as a hard PVC film which is suitable for being printed with water-soluble ink. Still preferably, said PVC film for said decor layer is substantially free of plasticizers, that is, preferably comprising less than 5% by weight of plasticizers, and more preferably less than 2% by weight of plasticizers. Such hard PVC film offers the advantage that a good and qualitative printing can be achieved, especially when a drying process should be carried out for drying the applied water-based pigmented ink. Preferably, for said wear layer, a hard PVC film is used.

In a preferred embodiment of the method according to the second aspect of the invention, said obtained panel is in a further processing step levelled at at least one surface, and preferably both at said wear layer and said balance layer or substrate layer.

Furthermore, it is clear that the granulate or the dryblend which is used for the afore-mentioned first layer should not necessarily be identical to the granulate or dryblend which is used for the afore-mentioned second layer. By using granulates or dryblends of mutually different composition and/or average particle size, special properties can be achieved.

The above understanding is, of course, useful, independent of the fact whether or not an embedded glass fibre layer is applied. Therefore, the invention, according to an independent third aspect, relates a method for manufacturing panels, wherein this method comprises at least the step of forming a first layer and a second layer of thermoplastic material, characterized in that, in order to form afore-mentioned first layer, a first granulate from the afore-mentioned thermoplastic material is spread, and afterwards, in order to form the second layer, a second granulate of the afore-mentioned thermoplastic material is spread over the afore-mentioned first layer, wherein both layers, in a subsequent step, are consolidated, and wherein the composition and/or the average particle size of the first granulate is different compared to the second granulate.

In a preferred embodiment, the present invention provides a method according to the second aspect of the invention, wherein a first thermoplastic layer with glass fibre is provided on the underside of said panel and a second thermoplastic layer with glass fibre is provided at the upper side of said panel, and wherein at least one thermoplastic layer is extruded and coated on a glass fibre layer.

In a preferred embodiment, the present invention provides a method according to the second aspect of the invention, wherein said coating is pressed through said glass fibre layer.

In a preferred embodiment, the present invention provides a method according to the second aspect of the invention, wherein said thermoplastic layers are extruded at a temperature higher than 150° C. More preferably, said thermoplastic layers are extruded at a temperature higher than 170° C., and even more preferably at a temperature situated between 175° C. and 190° C.

In a preferred embodiment, the present invention provides a method according to the second aspect of the invention, wherein at least one thermoplastic layer is formed by extruding a thermoplastic, plasticizers, and fillers. In a preferred embodiment, the present invention provides a method according to the second aspect of the invention, wherein at least one thermoplastic layer is formed by foaming with a foaming agent.

In a preferred embodiment, the present invention provides a method according to the second aspect of the invention, wherein least one thermoplastic layer is formed by extruding a dryblend comprising a thermoplastic, and wherein at least one thermoplastic layer is formed by coating a thermoplastic paste, wherein said paste preferably comprises a thermoplastic, plasticizers, fillers, and additives.

The most preferred embodiment of a panel according to the invention is obtained by the suitable combination of several of the afore-mentioned aspects, which can be identified by a person skilled in the technical field of vinyl laminate panels for floor or wall coverings.

The invention claimed is:

1. Panel for wall or floor covering comprising two or more thermoplastic layers including at least one thermoplastic substrate layer and at least one top layer comprising at least one decor layer, a print layer and a transparent wear layer, and wherein each of said thermoplastic substrate layer and said top layer is provided with a reinforcement layer comprising glass fibres, wherein said transparent wear layer is provided with a relief having a depth of at least 0.2 mm, wherein said decor layer with print layer comprises a printed plastic film with a thickness ranging between 0.1 mm and 1.0 mm, and wherein said substrate layer comprises a PVC foam.

2. Panel according to claim 1, wherein said substrate layer comprises a closed cell PVC foam having a density of between 200 kg/m$^3$ and 2500 kg/m$^3$.

3. Panel according to claim 1, wherein said substrate layer comprises a closed cell PVC foam having a density of between 600 kg/m$^3$ and 2000 kg/m$^3$.

4. Panel according to claim 1, wherein each of said at least one thermoplastic substrate layer and said at least one top layer encloses respective said reinforcement layer.

5. Panel according to claim 1, wherein said panel comprises a balance layer.

6. Panel according to claim 1, wherein said panel is provided with connection means at least at two opposite edges.

7. Panel for wall or floor covering comprising two or more thermoplastic layers including at least one thermoplastic substrate layer and at least one top layer comprising at least one decor layer, a print layer and a transparent wear layer, and wherein each of said thermoplastic substrate layer and said top layer is provided with a reinforcement layer comprising glass fibres, wherein said transparent wear layer is provided with a relief having a depth of at least 0.2 mm, wherein said decor layer with print layer comprises a printed plastic film with a thickness ranging between 0.1 mm and 1.0 mm, wherein said printed plastic film is made of PVC film comprising PVC with a K-value comprised between 60 and 75, measured according to EN ISO 1628-2, wherein said transparent wear layer comprises PVC with a K-value comprised between 70 and 85, measured according to EN ISO 1628-2.

8. Panel according to claim 7, wherein said substrate layer comprises a PVC foam.

9. Panel according to claim 7, wherein said substrate layer comprises a closed cell PVC foam having a density of between 200 kg/m$^3$ and 2500 kg/m$^3$.

10. Panel according to claim 7, wherein said substrate layer comprises a closed cell PVC foam having a density of between 600 kg/m$^3$ and 2000 kg/m$^3$.

11. Panel according to claim 7, wherein each of said at least one thermoplastic substrate layer and said at least one top layer encloses respective said reinforcement layer.

12. Panel according to claim 7, wherein said panel comprises a balance layer.

13. Panel according to claim 7, wherein said panel is provided with connection means at least at two opposite edges.

* * * * *